(12) United States Patent
Lee et al.

(10) Patent No.: US 11,886,104 B2
(45) Date of Patent: Jan. 30, 2024

(54) LIGHT SOURCE SYSTEM

(71) Applicant: Qisda Corporation, Taoyuan (TW)

(72) Inventors: Peng Lee, Taoyuan (TW); Tsung-Hsun Wu, Taoyuan (TW); Ching-Tze Huang, Taoyuan (TW); Jia-Ming Zhang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 101 days.

(21) Appl. No.: 17/585,675

(22) Filed: Jan. 27, 2022

(65) Prior Publication Data

US 2023/0176466 A1 Jun. 8, 2023

(30) Foreign Application Priority Data

Dec. 2, 2021 (CN) .......................... 202111455964.1

(51) Int. Cl.
*G03B 33/08* (2006.01)
*G03B 21/20* (2006.01)
*G02B 26/00* (2006.01)

(52) U.S. Cl.
CPC ........... *G03B 33/08* (2013.01); *G02B 26/008* (2013.01); *G03B 21/204* (2013.01)

(58) Field of Classification Search
None
See application file for complete search history.

(56) References Cited

U.S. PATENT DOCUMENTS

2013/0021587 A1* 1/2013 Miyazaki ............. G02B 26/008
362/84
2020/0285136 A1* 9/2020 Huang ................. H04N 9/3144

FOREIGN PATENT DOCUMENTS

| CN | 107885021 A | 4/2018 |
| CN | 108563088 A | 9/2018 |
| CN | 110389489 A | 10/2019 |

* cited by examiner

*Primary Examiner* — Bao-Luan Q Le
*Assistant Examiner* — Danell L Owens

(57) ABSTRACT

A light source system includes a first light emitter configured to emit a first light with a first color band in a first time interval of a time period, a second light emitter configured to emit a second light with a second color band in a second time interval of the time period rather than in the rest of the time period other than the second time interval, and a light guide disposed downstream from the first light emitter and the second light emitter. The first time interval and the second time interval overlap in an overlapping time interval. The first light emitter and the second light emitter synchronously emit the first light and the second light in the overlapping time interval to form a combined light beam in the light guide. The light with the second color band is dominant of the combined light beam.

17 Claims, 10 Drawing Sheets

LIGHT SOURCE SYSTEM

This application claims the benefit of People's Republic of China patent application Ser. No. 202111455964.1, filed Dec. 2, 2021, the invention of which is incorporated by reference herein in its entirety.

TECHNICAL FIELD

The present invention relates in general to a light source system, and more particularly to a light source system in which each light emitter is controlled in time sequence.

BACKGROUND

The light source system can emit three primary colors of light, such as red light, green light, and blue light (R, G, B), and produce a colorful display effect by adjusting the ratio and timing of the three primary colors of light. The light source system is often used in a variety of projection equipment, such as projectors, to magnify the image signal provided by the video signal source and display it on the projection screen.

In order to further improve the characteristics of the light source system, many artisans in related fields have made great efforts to develop. How to provide a light source system that simultaneously achieves color gamut change and brightness enhancement is one of the goals pursued by the artisans in the related fields.

SUMMARY

The present invention is directed to a light source system that produces a combined light beam by allowing two light emitters to emit coloured light simultaneously in one or more time intervals of a time period. The combined light beam is dominated by the color band of one of the coloured light, but has a lower color purity compared to that coloured light, thereby achieving the effect of color gamut change and brightness enhancement.

According to one aspect of the present invention, a light source system is provided. The light source system includes a first light emitter, a second light emitter and a light guide. The first light emitter is configured to emit a first light with a first color band in a first time interval of a time period. The second light emitter is configured to emit a second light with a second color band in a second time interval of the time period, and not emit the second light in the rest of the time period other than the second time interval. The light guide is disposed downstream from the first light emitter and the second light emitter. The first time interval and the second time interval overlap in an overlapping time interval. The first light emitter and the second light emitter synchronously emit the first light and the second light in the overlapping time interval to form a combined light beam in the light guide. The light with the second color band is dominant of the combined light beam.

The above and other aspects of the invention will become better understood with regard to the following detailed description of the preferred but non-limiting embodiment(s). The following description is made with reference to the accompanying drawings.

DETAILED DESCRIPTION

The light source system provided in the present invention produces a combined light beam by allowing two light emitters to emit coloured light simultaneously in one or more time intervals of a time period. The combined light beam is dominated by the color band of one of the coloured light, but has a lower color purity compared to that coloured light, thereby achieving the effect of color gamut change and brightness enhancement.

Embodiments of the present invention will be described in detail hereinafter, and illustrated with the accompanying drawings. In addition to these detailed descriptions, the present invention may be broadly implemented in other embodiments, and any substitutable, modified, equivalent variations of the embodiments are included within the scope of the present invention. The scope of the present is subject to the claims thereafter. In the description of the specification, many specific details and examples of embodiments are provided in order to provide the reader with a more complete understanding of the present invention; however, these specific details and examples of embodiments should not be considered as limitations of the present invention. In addition, well-known steps or elements are not described in detail to avoid unnecessary limitations of the present invention.

Some of the directional terms mentioned in the following embodiments, such as "up", "down", "front", "back", "left", and "right", are used only for reference to the orientation of the drawings. Therefore, the directional terms used are for illustration and not for limiting the present invention. Furthermore, the terms "first", "second" . . . are used for the purpose of identifying the elements and are not used to restrict the elements. In addition, the terms "second light emitter" and "third light emitter" are interchangeable in terms and semantics in the embodiments. For example, in one embodiment, when the "second light emitter" and the "third light emitter" are described as a red light emitter and a green light emitter, respectively, in another embodiment, the green light emitter may be described as the "second light emitter" and the red light emitter may be described as the "third light emitter". The combined light beam described in the present invention means that more than one light beam may be combined into one output light beam.

Figure 1A:
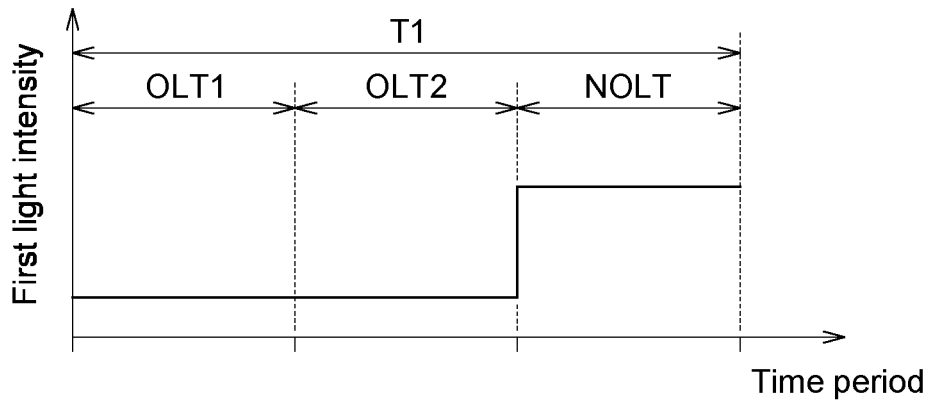
FIGS. 1A, 1B and 1C are schematic diagrams showing first type of timing control for each light emitter of the light source system of the present invention.
Figure 1B:
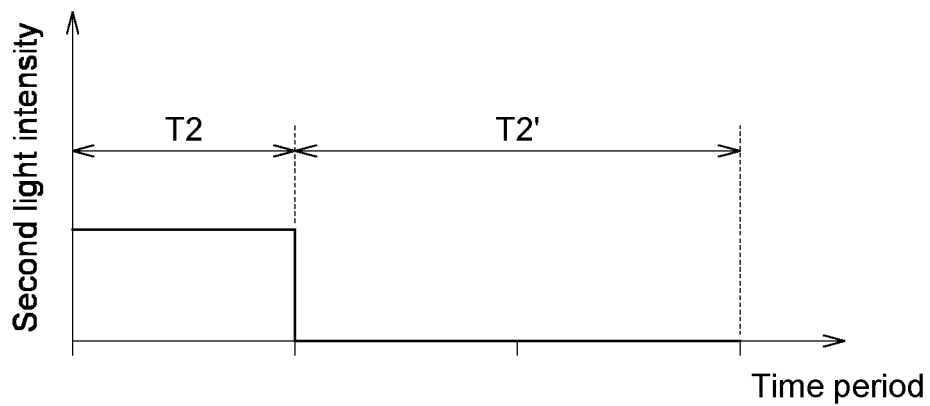
Figure 1C:
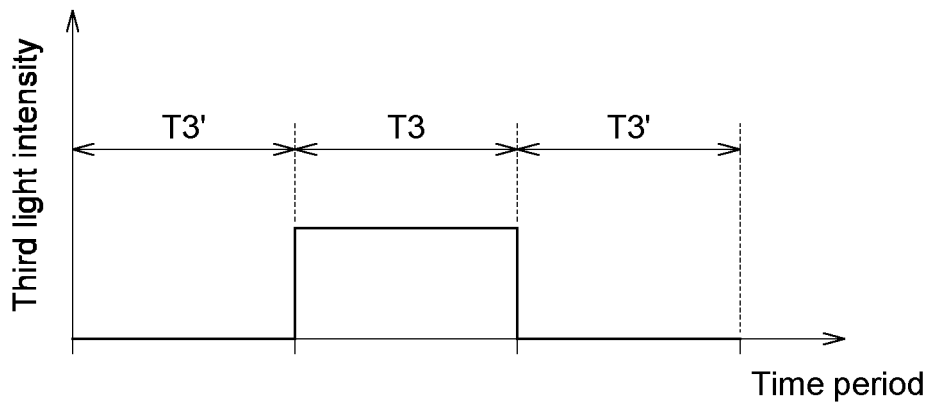
Figure 2A:
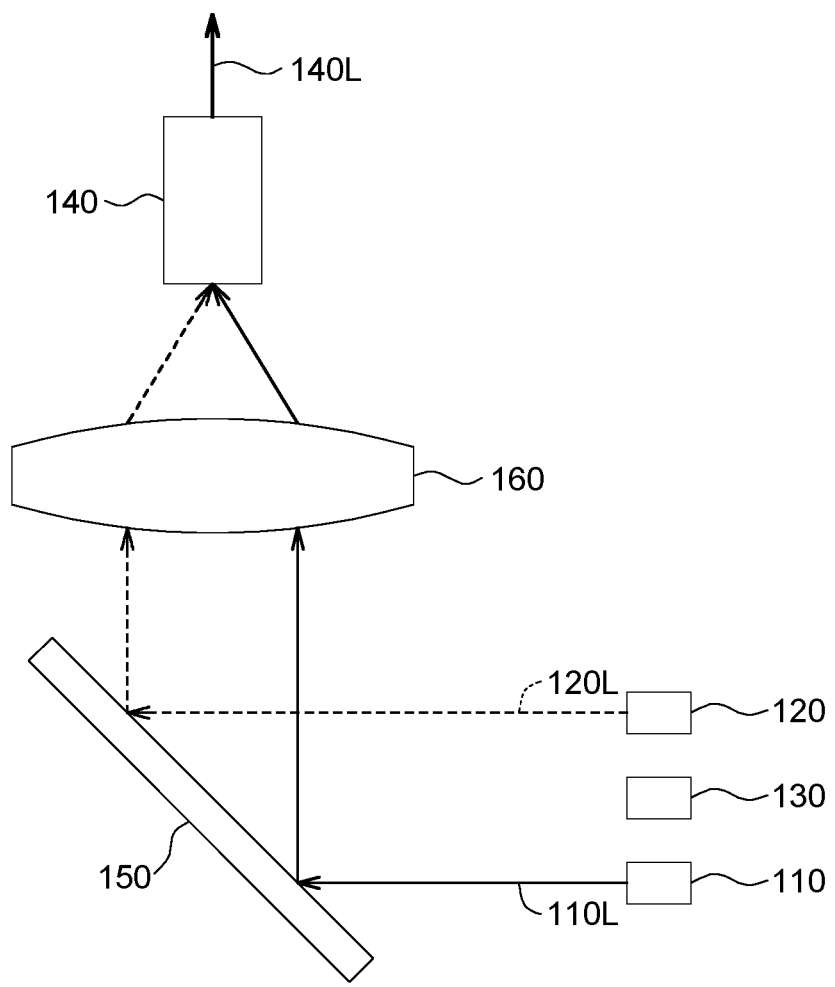
FIGS. 2A, 2B and 2C are drawings showing the layout of the light source system according to one embodiment of the present invention.
Figure 2B:
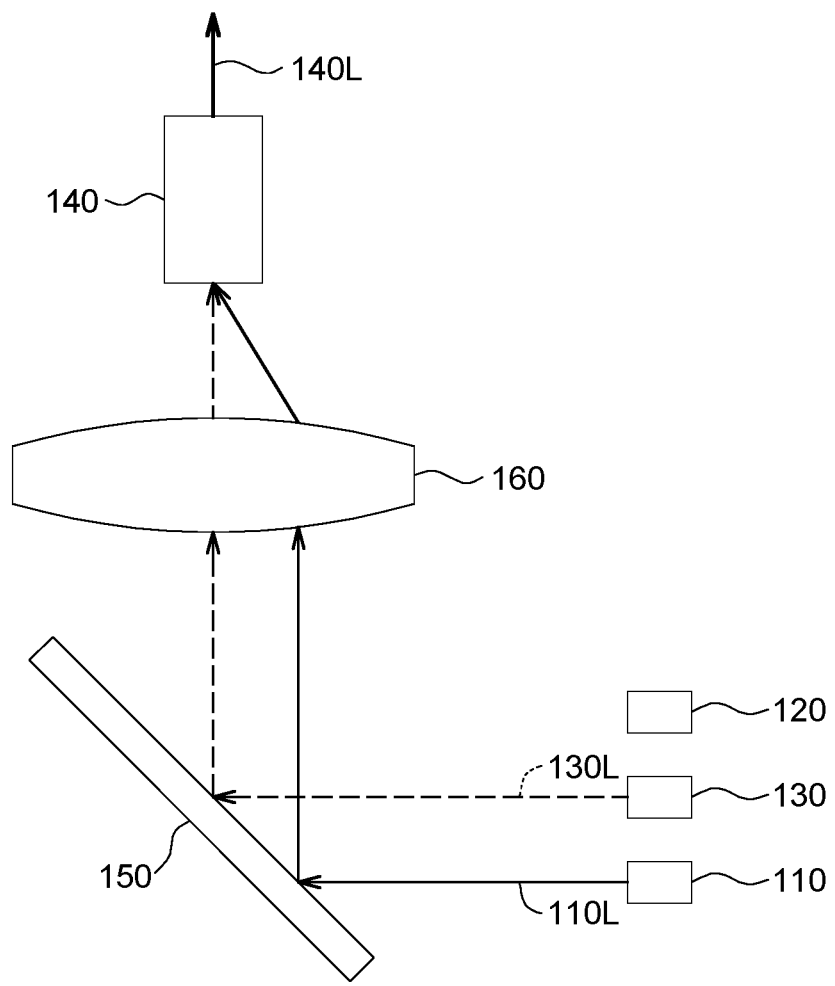
Figure 2C:
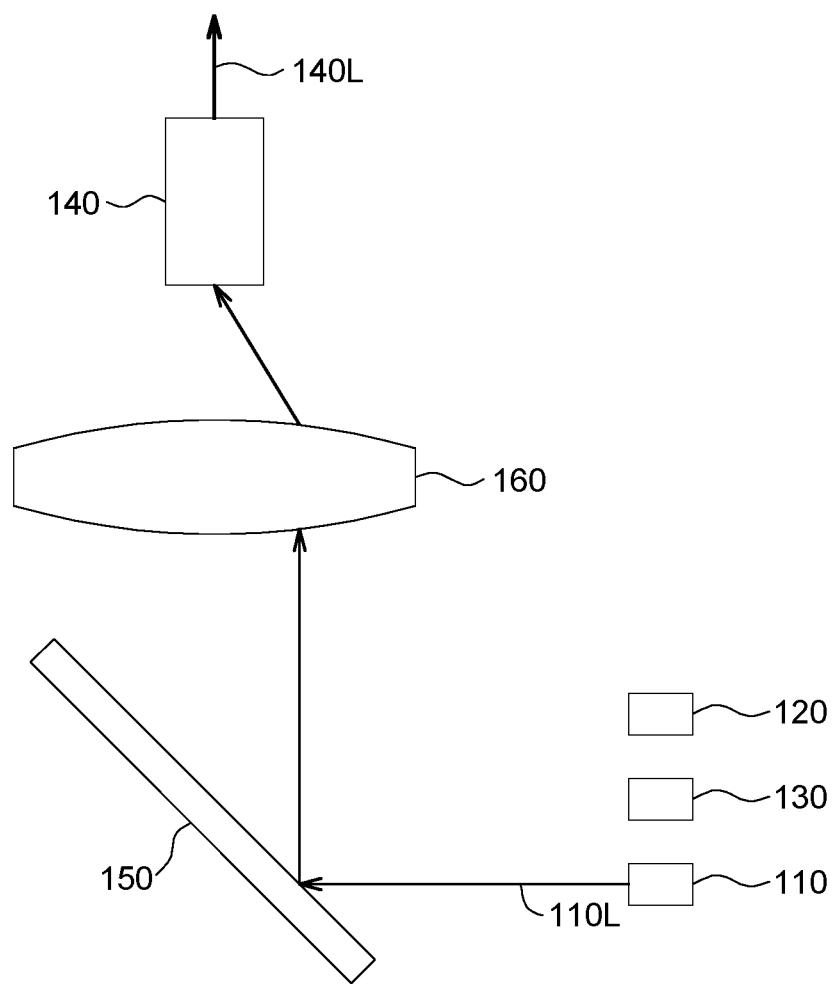

FIGS. 1A, 1B and 1C are schematic diagrams showing first type of timing control for each light emitter of the light source system of the present invention. FIGS. 2A, 2B and 2C are drawings showing the layout of the light source system 100 according to one embodiment of the present invention. The light source system 100 may be controlled by means of the timing control as shown in FIGS. 2A, 2B and 2C.

Referring to FIGS. 1A, 1B, 1C, 2A, 2B and 2C, the light source system 100 may include a first light emitter 110, a second light emitter 120 and a third light emitter 130, which may emit a first light 110L, a second light 120L and a third light 130L, respectively. Here, FIG. 1A shows the timing control for the first light emitter 110 to output the first light 110L, FIG. 1B shows the timing control for the second light emitter 120 to output the second light 120L, and FIG. 1C shows the timing control for the third light emitter 130 to output the third light 130L.

In one embodiment, the first light emitter 110, the second light emitter 120 and the third light emitter 130 may be light emitters of laser diode (LD). The first light 110L output from the first light emitter 110 is provided with a first color band, the peak wavelength of the spectrum of which is in a range from 440 nm to 480 nm; that is, the first light 110L is blue light. The second light 120L output from the second light emitter 120 is provided with a second color band, the peak wavelength of the spectrum of which is in a range from 600 nm to 700 nm; that is, the second light 120L is red light. The third light 130L output from the third light emitter 130 is provided with a third color band, the peak wavelength of the spectrum of which is in a range from 512 nm to 560 nm; that is, the third light 130L is green light.

Referring to FIGS. 2A, 2B and 2C, the light source system 100 may further include a reflector 150, a lens 160 and a light guide 140 disposed downstream from the first light emitter 110, the second light emitter 120 and the third light emitter 130. The reflector 150 is configured to reflect the first light 110L emitted from the first light emitter 110, the second light 120L emitted from the second light emitter 120 and the third light 130L emitted from the third light emitter 130. The lens 160 is configured to condense or transmit the light reflected by the reflector 150 to the light guide 140. The light guide 140 is configured to receive the light passing through the lens 160, so as to form a combined light beam 140L in the light guide 140 and direct the combined light beam 140L to, for example, a projection module (not shown) for use.

Referring to FIGS. 1A, 1B, 1C, 2A and 2C, the first light emitter 110 emits the first light 110L in a first time interval T1 of a time period. The second light emitter 120 emits the second light 120L in a second time interval T2 of the time period, but does not emit light in the rest T2' of the time period. The third light emitter 130 emits the third light 130L in a third time interval T3 of the time period, but does not emit light in the rest T3' of the time period.

As shown in FIG. 1A, the first light emitter 110 continuously emits the first light 110L during the time interval of the entire time period. That is, the first time interval T1 covers entire of the time period. Compared to FIGS. 1A, 1B and 1C, the first time interval T1 may consist of overlapping time intervals OLT1, OLT2 and a non-overlapping time interval NOLT. The overlapping time interval OLT1 is the time interval when the first time interval T1 and the second time interval T2 overlap each other; i.e., the time interval when the first light emitter 110 and the second light emitter 120 emit the first light 110L and the second light 120L at the same time. The overlapping time interval OLT2 is the time interval when the first time interval T1 and the third time interval T3 overlap each other; i.e., the time interval when the first light emitter 110 and the third light emitter 130 emit the first light 110L and the third light 130L at the same time.

As shown in FIG. 1A, the first light emitter 110 emits the first light 110L with a first light intensity in the overlapping time intervals OLT1, OLT2, and emits the first light 110L with a second light intensity in the non-overlapping time interval NOLT, and the first light intensity is lower than the second light intensity. That is, although the first light emitter 110 continuously emits the first light 110L during the time interval of the entire time period, the light intensity of the first light 110L emitted in the overlapping time intervals OLT1, OLT2 is smaller than the light intensity of the first light 110L emitted in the non-overlapping time interval NOLT, so that the first light 110L of the first light emitter 110 has a variation of light intensity during the entire time period.

In addition, referring to FIG. 1A, 1B and 1C, the light intensity of the first light 110L is lower than the light intensity of the second light 120L and lower than the light intensity of the third light 130L in the overlapping time interval OLT1 and the overlapping time interval OLT2. In detail, as shown in FIG. 2A, the condition where the timing is overlapping time interval OLT1 is illustrated. In this condition, the combined light beam 140L includes the second light 120L and the first light 110L, and the light intensity of the first light 110L is lower than the light intensity of the second light 120L. Therefore, the combined light beam 140L is dominated by the second color band of the second light 120L, but mixed with some first light 110L with low light intensity, so that the brightness of the combined light beam 140L may be increased, and at the same time to achieve the effect of color gamut change. In addition, although the combined light beam 140L is dominated by the second color band of the second light 120L, the combined light beam 140L has a lower color purity. When the second light emitter 120 is a laser diode, the speckle problem of laser may be effectively improved. Similarly, as shown in FIG. 2B, the condition where the timing is overlapping time interval OLT2 is illustrated. In this condition, the combined light beam 140L includes the third light 130L and the first light 110L, and the light intensity of the first light 110L is lower than the light intensity of the third light 130L. Therefore, the combined light beam 140L is dominated by the third color band of the third light 130L, but mixed with some first light 110L with low light intensity, so that the brightness of the combined light beam 140L may be increased, and at the same time to achieve the effect of color gamut change. In addition, although the combined light beam 140L is dominated by the third color band of the third light 130L, the combined light beam 140L has a lower color purity. When the third light emitter 130 is a laser diode, the speckle problem of laser may be effectively improved.

Figure 3A:
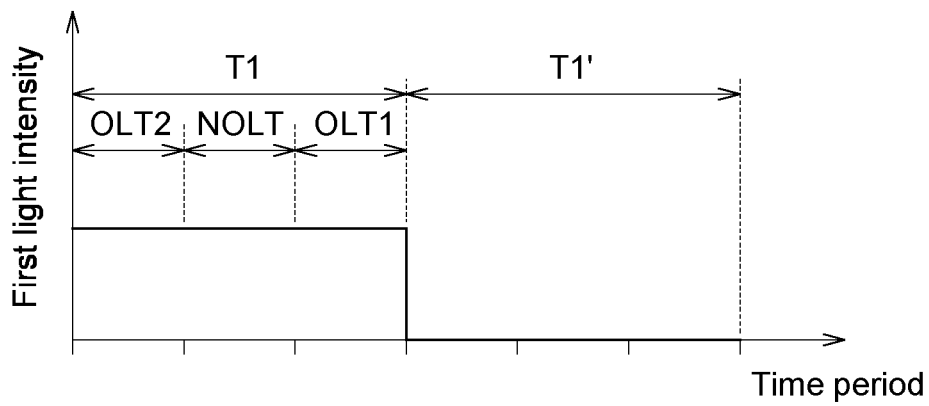
FIGS. 3A, 3B and 3C are schematic diagrams showing second type of timing control for each light emitter of the light source system of the present invention.
Figure 3B:
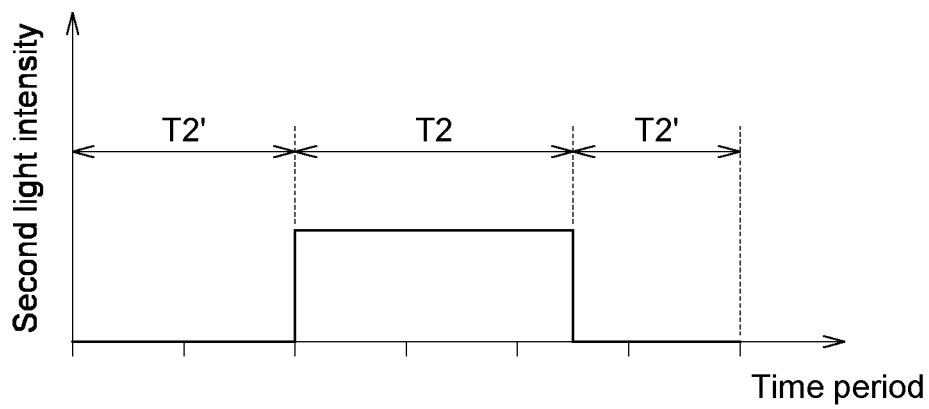
Figure 3C:
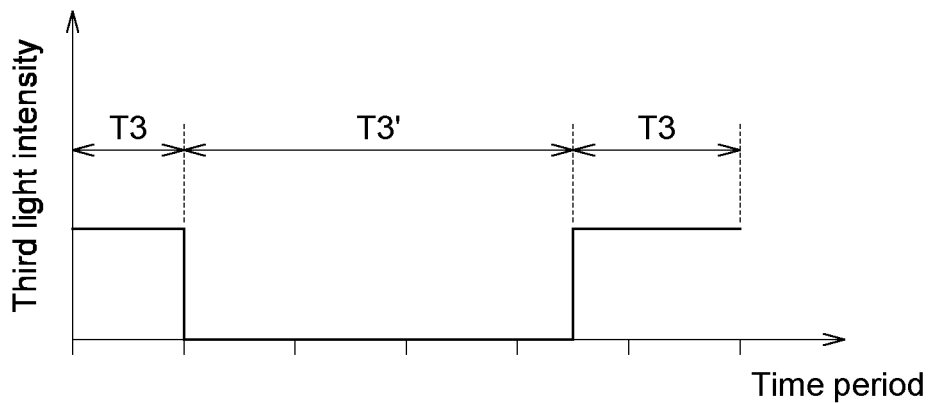
Figure 4:
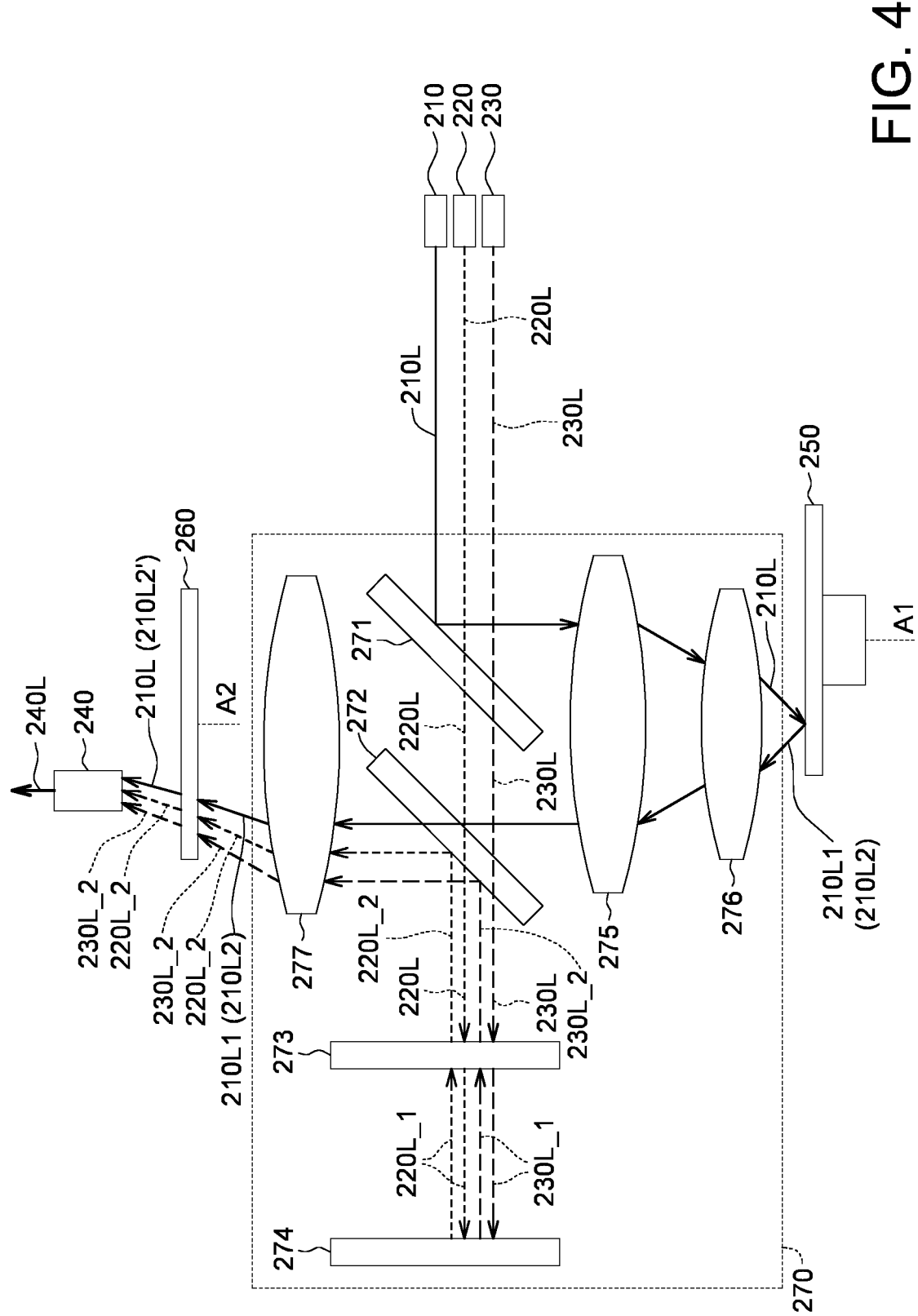
FIG. 4 is a drawing showing the layout of the light source system according to another embodiment of the present invention.

FIGS. 3A, 3B and 3C are schematic diagrams showing second type of timing control for each light emitter of the light source system of the present invention. FIG. 4 is a drawing showing the layout of the light source system 200 according to another embodiment of the present invention. The light source system 200 may be controlled by means of the timing control as shown in FIGS. 3A, 3B and 3C.

Referring to FIG. 4, the light source system 200 may include a first light emitter 210, a second light emitter 220, a third light emitter 230, a light guide 240, a phosphor wheel 250, a color wheel 260 and a light-guiding module 270. The first light emitter 210, the second light emitter 220, the third light emitter 230 and the light guide 240 are similar to the first light emitter 110, the second light emitter 120, the third light emitter 130 and the light guide 140 described above, and are not repeatedly described herein.

The phosphor wheel 250 is disposed downstream from the first light emitter 210, instead of being disposed downstream from the second light emitter 220 and the third light emitter 230. That is, the optical paths of the second light 220L and the third light 230L do not pass the phosphor wheel 250. The color wheel 260 is disposed downstream from the first light emitter 210, the second light emitter 220 and the third light emitter 230. The light-guiding module 270 is disposed between the phosphor wheel 250 and the color wheel 260, and is configured to direct the first light 210L through the phosphor wheel 250 to the color wheel 260, and further direct the second light 220L and the third light 230L to the color wheel 260.

In one embodiment, the light-guiding module 270 may include a first light splitter 271, a second light splitter 272, a polarizer 273, a reflector 274 and lenses 275, 276, 277. The first light splitter 271 and the second light splitter 272, such as a beamsplitting plate glass, a dichroic mirror (e.g., half-through, half-reflective mirror), and other optical elements capable of separating different wavelengths or color but the present invention is not limited thereto, may be provided with wavelength selectivity. For example, the first light splitter 271 may reflect the first light 210L. After being reflected by the first light splitter 271, the first light 210L passes through the lenses 275, 276 sequentially to focus on the phosphor wheel 250, and becomes a first reflected light 210L1 (or a photoluminescence 210L2). The second light splitter 272 may allow the first reflected light 210L1 (or the photoluminescence 210L2) to pass through, and the first reflected light 210L1 (or the photoluminescence 210L2) then passes through the lens 277 and is directed to the color wheel 260.

On the other hand, the first light splitter 271 and the second light splitter 272 may allow the second light 220L and the third light 230L to pass through. The second light 220L and the third light 230L are provided with a first polarization state at the outset. After passing through the second light splitter 272, the second light 220L and the third light 230L first pass through the polarizer 273 to become the second light 220L_1 and the third light 230L_1 with a changed polarization state. Next, the second light 220L_1 and the third light 230L_1 with the changed polarization state are reflected by the reflector 274 and pass through the polarizer 273 again to become the second light 220L_2 and the third light 230L_2 with a second polarization state. In one embodiment, the polarizer 273 may be a quarter-wave plate, and thus the second light 220L_2 and the third light 230L_2 are rotated by 90° compared to the second light 220L and the third light 230L, so that the second light 220L and the third light 230L, which were originally P-waves, for example, are transformed into the second light 220L_2 and the third light 230L_2, which are S-waves. Next, the second light splitter 272 reflects the second light 220L_2 and the third light 230L_2 with the second polarization state and directs them to the lens 277, so that the second light 220L_2 and the third light 230L_2 pass through the lens 277 and are directed to the color wheel 260.

Referring to FIGS. 3A, 3B, 3C and 4, FIG. 3A shows the timing control for the first light emitter 210 to output the first light 210L, FIG. 3B shows the timing control for the second light emitter 220 to output the second light 220L, and FIG. 3C shows the timing control for the third light emitter 230 to output the third light 230L. The first light emitter 210 emits the first light 210L in a first time interval T1 of a time period, but does not emit light in the rest T1' of the time period. The second light emitter 220 emits the second light 220L in a second time interval T2 of the time period, but does not emit light in the rest T2' of the time period. The third light emitter 230 emits the third light 230L in a third time interval T3 of the time period, but does not emit light in the rest T3' of the time period.

Comparing FIG. 3A with FIG. 3B and FIG. 3C, the first time interval T1 may consist of overlapping time intervals OLT1, OLT2 and a non-overlapping time interval NOLT. The overlapping time interval OLT1 is the time interval when the first time interval T1 and the second time interval T2 overlap each other; i.e., the time interval when the first light emitter 210 and the second light emitter 220 emit the first light 210L and the second light 220L at the same time. The overlapping time interval OLT2 is the time interval when the first time interval T1 and the third time interval T3 overlap each other; i.e., the time interval when the first light emitter 210 and the third light emitter 230 emit the first light 210L and the third light 230L at the same time.

Figure 5A:
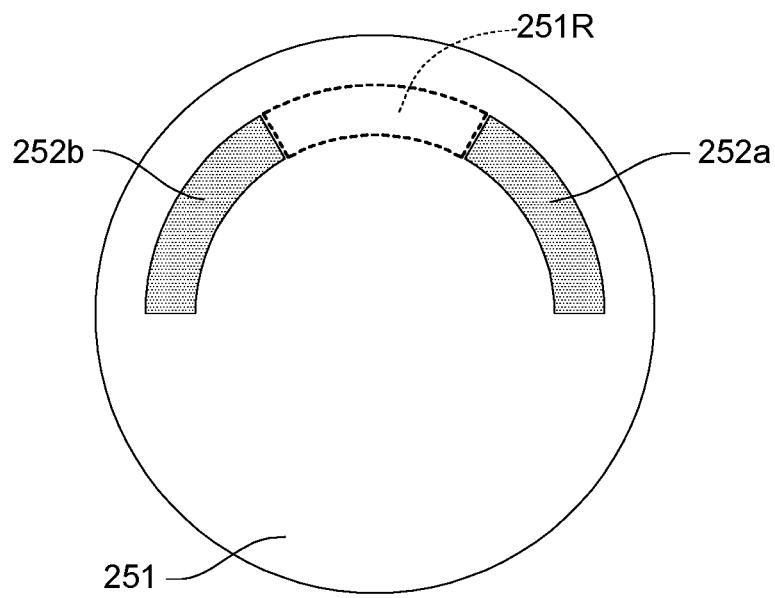
FIG. 5A is a top view of the phosphor wheel in FIG. 4.

FIG. 5A is a top view of the phosphor wheel 250 in FIG. 4. Referring to FIG. 4 and FIG. 5A, the phosphor wheel 250 includes a substrate 251, wavelength conversion areas 252a, 252b and a first reflection area 251R, and is configured to rotate about the axis A1. The wavelength conversion areas 252a, 252b and the first reflection area 251R are arranged in a ring around the axis A1 on the substrate 251. The first reflection area 251R is disposed between the two wavelength conversion areas 252a, 252b, and disposed in a rotation path of the wavelength conversion areas 252a, 252b. The wavelength conversion areas 252a, 252b and the first reflection area 251R across about π radians. In one embodiment, the wavelength conversion areas 252a, 252b may be a phosphor powder, for example, a yellow phosphor powder. When the light is focused on the wavelength conversion areas 252a, 252b, the phosphor powder is excited to produce a photoluminescence with a corresponding color. When the light is focused on the first reflection area 251R, the light is reflected in all directions from the first reflection area 251R to become the first reflected light.

Referring to FIGS. 3A, 4 and 5A, the wavelength conversion areas 252a, 252b and the first reflection area 251R are disposed in the optical path of the first light 210L. More specifically, the wavelength conversion area 252a is disposed in the optical path of the first light 210L emitted from the first light emitter 210 in the overlapping time interval OLT1, the first reflection area 251R is disposed in the optical path of the first light 210L emitted from the first light emitter 210 in the non-overlapping time interval NOLT, and the wavelength conversion area 252b is disposed in the optical path of the first light 210L emitted from the first light emitter 210 in the overlapping time interval OLT2. During the overlapping time interval OLT1, OLT2, the first light 210L is reflected by the wavelength conversion area 252a, 252b to become a photoluminescence 210L2; during the non-overlapping time interval NOLT, the first light 210L is reflected by the first reflection area 251R to become a first reflected light 210L1.

Figure 5B:
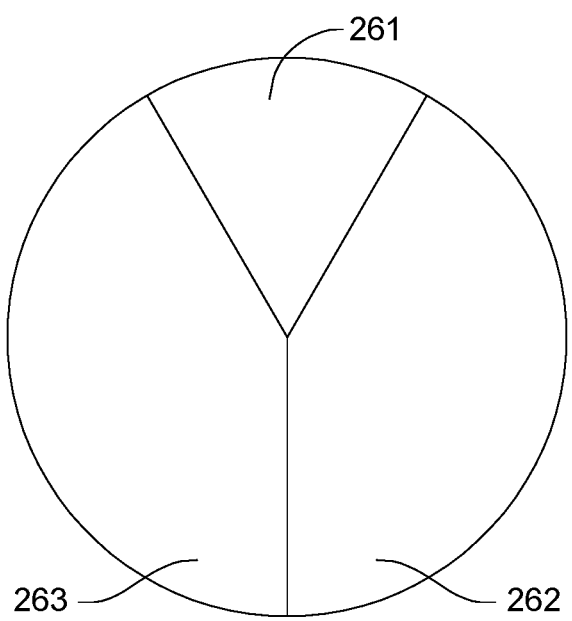
FIG. 5B is a top view of the color wheel in FIG. 4.

Accordingly, the design and rotation of the color wheel 260 also corresponds to the phosphor wheel 250. FIG. 5B is a top view of the color wheel 260 in FIG. 4. Referring to FIGS. 4, 5A and 5B, the color wheel 260 includes a first color filter 261, a second color filter 262 and a third color filter 263, and is configured to rotate about the axis A2. The first color filter 261 is, for example, a blue zone configured to receive the first reflected light 210L1 reflected by the first reflection area 251R. More specifically, the first color filter 261 is disposed in the optical path of the first reflected light 210L1 so that the first light 210L (e.g., the blue light) filters therethrough into the light guide 240. With reference to FIG.

3A, the light (i.e., the first reflected light 210L1) which can reach the first color filter 261 corresponds to the first light 210L emitted by the first light emitter 210 in the non-overlapping time interval NOLT.

Referring to FIGS. 4, 5A and 5B, the second color filter 262 is, for example, a red zone configured to receive the second light 220L_2 and the photoluminescence 210L2 reflected by the wavelength conversion area 252a. More specifically, the second color filter 262 is disposed in the optical paths of the second light 220L_2 and the photoluminescence 210L2 so that the second light 220L_2 (e.g., the red light) and a filtered light 210L2' (e.g., the red light with a lower color purity) with the second color band filter therethrough into the light guide 240. With reference to FIG. 3A and FIG. 3B, the light (i.e., the photoluminescence 210L2 and the second light 220L_2) which can reach the second color filter 262 corresponds to the first light 210L emitted by the first light emitter 210 in the overlapping time interval OLT1 and the second light 220L emitted by the second light emitter 220 in the second time interval T2. It can be seen that the first light 210L and the second light 220L emitted from the first light emitter 210 and the second light emitter 220 in the overlapping time interval OLT1 are later on changed into the photoluminescence 210L2 and the second light 220L_2, respectively, and the photoluminescence 210L2 and the second light 220L_2 pass through the second color filter 262 at the same time and are changed into the filtered light 210L2' and the second light 220L_2, respectively, to form a combined light beam 240L in the light guide 240. The combined light beam 240L includes the second light 220L_2 with a higher color purity and the filtered light 210L2' with a lower color purity, so that the brightness of the combined light beam 240L may be increased, and at the same time to achieve the effect of color gamut change. In addition, although the combined light beam 240L is dominated by the second color band of the red light, the combined light beam 240L has a lower color purity than the native red light. Furthermore, when the second light emitter 220 is a laser diode, the speckle problem of laser may be effectively improved.

Referring to FIGS. 4, 5A and 5B, the third color filter 263 is, for example, a green zone configured to receive the third light 230L_2 and the photoluminescence 210L2 reflected by the wavelength conversion area 252b. More specifically, the third color filter 263 is disposed in the optical paths of the third light 230L_2 and the photoluminescence 210L2 so that the third light 230L_2 (e.g., the green light) and a filtered light 210L2' (e.g., the green light with a lower color purity) with the third color band filter therethrough into the light guide 240. With reference to FIG. 3A and FIG. 3C, the light (i.e., the photoluminescence 210L2 and the third light 230L_2) which can reach the third color filter 263 corresponds to the first light 210L emitted by the first light emitter 210 in the overlapping time interval OLT2 and the third light 230L emitted by the third light emitter 230 in the third time interval T3. It can be seen that the first light 210L and the third light 230L emitted from the first light emitter 210 and the third light emitter 230 in the overlapping time interval OLT2 are later on changed into the photoluminescence 210L2 and the third light 230L_2, respectively, and the photoluminescence 210L2 and the third light 230L_2 pass through the third color filter 263 at the same time and are changed into the filtered light 210L2' and the third light 230L_2, respectively, to form a combined light beam 240L in the light guide 240. The combined light beam 240L includes the third light 230L_2 with a higher color purity and the filtered light 210L2' with a lower color purity, so that the brightness of the combined light beam 240L may be increased, and at the same time to achieve the effect of color gamut change. In addition, although the combined light beam 240L is dominated by the third color band of the green light, the combined light beam 240L has a lower color purity than the native green light. Furthermore, when the third light emitter 230 is a laser diode, the speckle problem of laser may be effectively improved.

Figure 6:
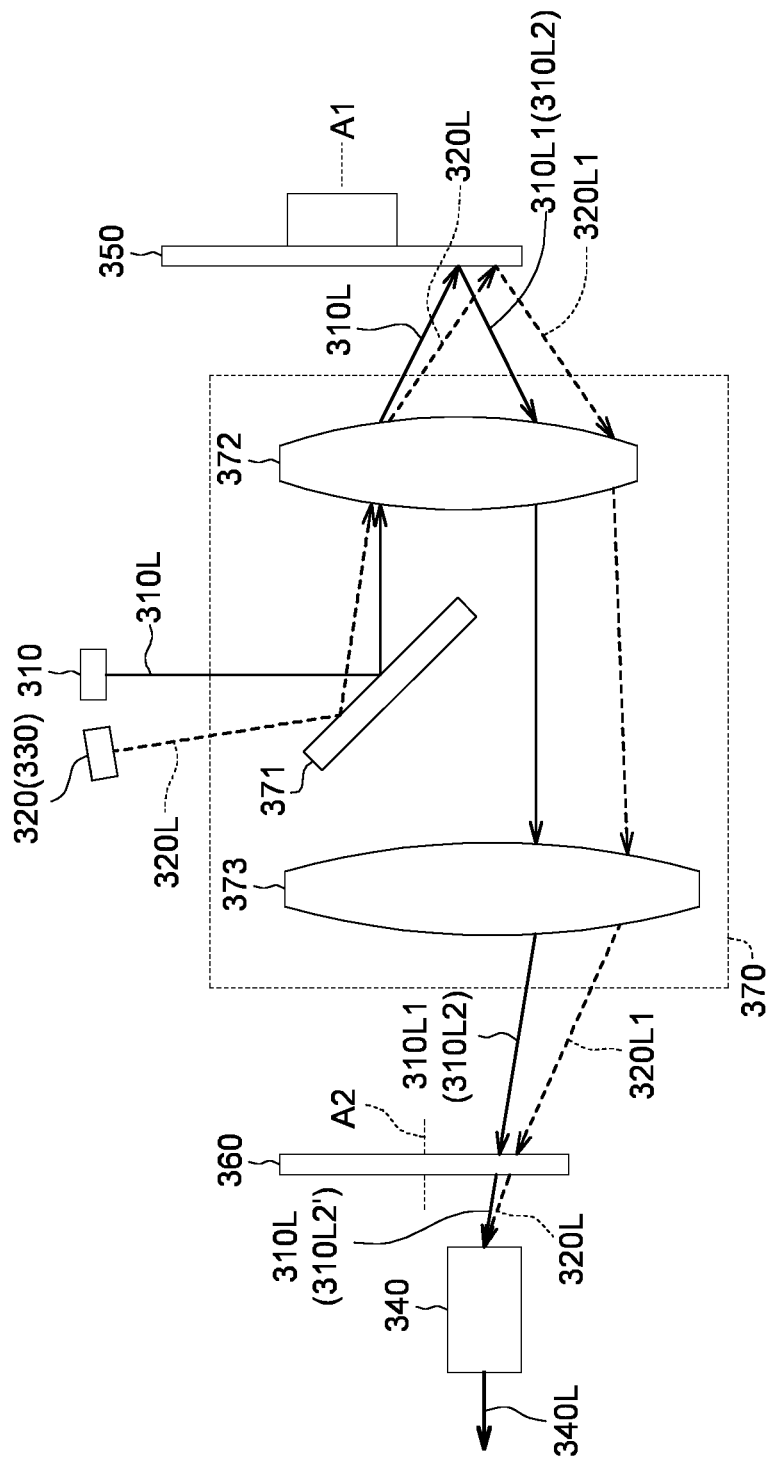
FIG. 6 is a drawing showing the layout of the light source system according to still another embodiment of the present invention.

FIG. 6 is a drawing showing the layout of the light source system 300 according to still another embodiment of the present invention. The light source system 300 may be controlled by means of the timing control as shown in FIGS. 3A, 3B and 3C.

Referring to FIG. 6, the light source system 300 may include a first light emitter 310, a second light emitter 320, a third light emitter 330, a light guide 340, a phosphor wheel 350, a color wheel 360 and a light-guiding module 370. The first light emitter 310, the second light emitter 320, the third light emitter 330 and the light guide 340 are similar to the first light emitter 110, the second light emitter 120, the third light emitter 130 and the light guide 140 described above, and are not repeatedly described herein. In addition, in order to clearly show the necessary details, only the condition that the second light emitter 320 emits the second light 320L is illustrated, and the third light emitter 330 is omitted from the FIG. 6; however, it should be understood that the third light emitter 330 may also be present at the same time as the second light emitter 320 and have the same optical path of transmission as the second light emitter 320.

Compared to the embodiment of FIG. 4, in the present embodiment, the phosphor wheel 350 is not only disposed downstream from the first light emitter 310, but also disposed downstream from the second light emitter 320 and the third light emitter 330. That is, the optical paths of the second light 320L and the third light (not shown) pass the phosphor wheel 250. The color wheel 360 is disposed downstream from the first light emitter 310, the second light emitter 320 and the third light emitter 330. The light-guiding module 370 is disposed between the phosphor wheel 350 and the color wheel 360, and is configured to direct the first light 310L, the second light 320L and the third light (not shown) through the phosphor wheel 350 to the color wheel 360.

Figure 7A:
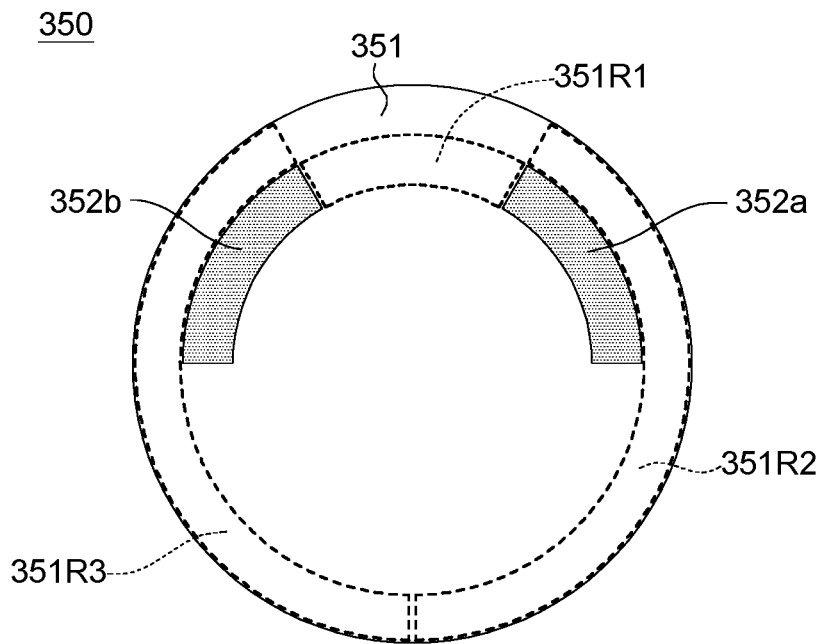
FIG. 7A is a top view of the phosphor wheel in FIG. 6.

FIG. 7A is a top view of the phosphor wheel 350 in FIG. 6. Referring to FIG. 6 and FIG. 7A, the phosphor wheel 350 includes a substrate 351, wavelength conversion areas 352a, 352b, a first reflection area 351R1, a second reflection area 351R2 and a third reflection area 351R3, and is configured to rotate about the axis A1. The structure and configuration of the wavelength conversion areas 352a, 352b and the first reflection area 351R1 are similar to those of the wavelength conversion areas 252a, 252b and the first reflection area 251R in FIG. 5A, and are not repeatedly described herein. The second reflection area 351R2 and the third reflection area 351R3 are arranged in a ring around the axis A1 on the substrate 351, but are located outside of the wavelength conversion areas 352a, 352b and the first reflection area 351R1. Thus, the second reflection area 351R2 and the third reflection area 351R3 are not disposed in a rotation path of the first reflection area 351R1. When the light is focused on the second reflection area 351R2 and the third reflection area 351R3, the light is reflected in all directions from the second reflection area 351R2 and the third reflection area 351R3 to become a second reflected light and a third reflected light.

Figure 7B:
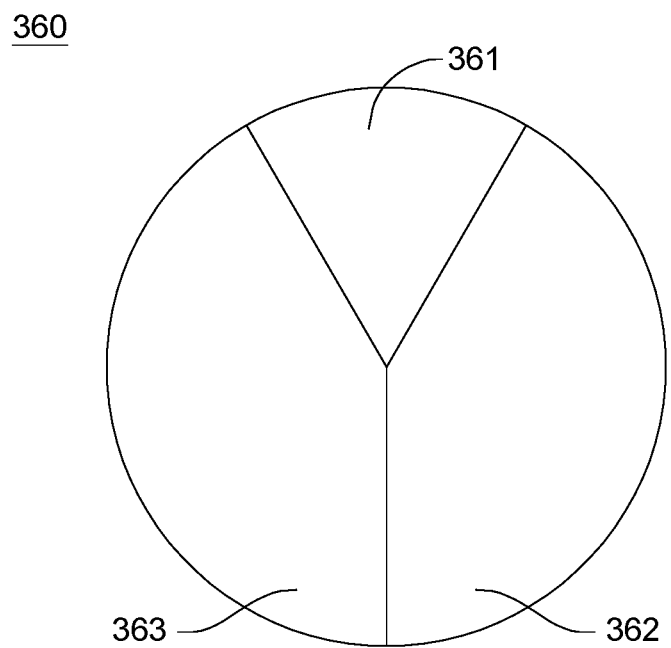
FIG. 7B is a top view of the color wheel in FIG. 6.

Referring to FIG. 7B, a top view of the color wheel 360 in FIG. 6 is illustrated. The color wheel 360 shown in FIG. 7B includes a first color filter 361, a second color filter 362 and a third color filter 363, the structure and configuration of which are similar to those of the color wheel 260 in FIG. 5B, and are not repeatedly described herein.

As shown in FIG. 6, in the present embodiment, the first light emitter 310, the second light emitter 320 and the third light emitter 330 are disposed on the same side of the light-guiding module 37, and the second light emitter 320 and the third light emitter 330 emit lights to the light-guiding module 370 at different angles. Further, the light-guiding module 370 may direct the first light 310L to the wavelength conversion area 352a, 352b or the first reflection area 351R1 located in the inner ring of the phosphor wheel 350, direct the second light 320L to the second reflection area 351R2 located in the outer ring of the phosphor wheel 350, and direct the third light (not shown) to the third reflection area 351R3 located in the outer ring of the phosphor wheel 350.

In one embodiment, the light-guiding module 370 may include a reflector 371 and lenses 372, 373. The reflector 371 is disposed in the optical paths of the first light 310L, the second light 320L and the third light (not shown), and the second light emitter 320 and the third light emitter 330 emit the second light 320L and the third light (not shown) to the reflector 371 at an angle different from that of the first light 310L, so that the first light 310L and the second light 320L (or the third light) are focused on different areas of the phosphor wheel 350 after being reflected by the reflector 371 and passing through the lens 372.

Referring to FIGS. 3A, 6 and 7, the first light emitter 310 may emit the first light 310L in the non-overlapping time interval NOLT. The emitted first light 310L may be focused on the first reflection area 351R1 of the phosphor wheel 350 to become a first reflected light 310L1. The reflected first reflected light 310L1 may pass through the lenses 372, 373 sequentially and be directed to the first color filter 361 of the color wheel 360 so that the first light 310L (e.g., the blue light) filters therethrough into the light guide 340. Therefore, the light (i.e., the first reflected light 310L1) which can reach the first color filter 361 corresponds to the first light 310L emitted by the first light emitter 310 in the non-overlapping time interval NOLT.

Referring to FIGS. 3A, 3B, 6 and 7A, the first light emitter 310 may emit the first light 310L in the overlapping time interval OLT1, and the second light emitter 320 may emit the second light 320L in the second time interval T2. The emitted first light 310L may be focused on the wavelength conversion area 352a of the phosphor wheel 350 to become a photoluminescence 310L2. In contrast, the emitted second light 320L may be focused on the second reflection area 351R2 of the phosphor wheel 350 to become a second reflected light 320L1. The reflected photoluminescence 310L2 and second reflected light 320L1 may pass through the lenses 372, 373 sequentially and be directed to the second color filter 362 of the color wheel 360 so that a filtered light 310L2' (e.g., the red light with a lower color purity) with the second color band and the second light 320L (e.g., the red light) respectively filter therethrough into the light guide 340. Therefore, the light (i.e., the photoluminescence 310L2 and the second reflected light 320L1) which can reach the second color filter 362 corresponds to the first light 310L emitted by the first light emitter 310 in the overlapping time interval OLT1 and the second light 320L emitted by the second light emitter 320 in the second time interval T2. It can be seen that the first light 310L and the second light 320L emitted from the first light emitter 310 and the second light emitter 320 in the overlapping time interval OLT1 are later on changed into the photoluminescence 310L2 and the second reflected light 320L1, respectively, and the photoluminescence 310L2 and the second reflected light 320L1 pass through the second color filter 362 at the same time and are changed into the filtered light 310L2' and the second light 320L, respectively, to form a combined light beam 340L in the light guide 340. The combined light beam 340L includes the second light 320L with a higher color purity and the filtered light 310L2' with a lower color purity, so that the brightness of the combined light beam 340L may be increased, and at the same time to achieve the effect of color gamut change. In addition, although the combined light beam 340L is dominated by the second color band of the red light, the combined light beam 340L has a lower color purity than the native red light. Furthermore, when the second light emitter 320 is a laser diode, the speckle problem of laser may be effectively improved.

Referring to FIGS. 3A, 3C, 6 and 7A, the first light emitter 310 may emit the first light 310L in the overlapping time interval OLT2, and the third light emitter 330 may emit the third light (not shown) in the third time interval T3. The emitted first light 310L may be focused on the wavelength conversion area 352b of the phosphor wheel 350 to become a photoluminescence 310L2. In contrast, the emitted third light (not shown) may be focused on the third reflection area 351R3 of the phosphor wheel 350 to become a third reflected light (not shown). The reflected photoluminescence 310L2 and third reflected light (not shown) may pass through the lenses 372, 373 sequentially and be directed to the third color filter 363 of the color wheel 360 so that a filtered light 310L2' (e.g., the green light with a lower color purity) with the third color band and the third light (not shown, e.g., the green light) respectively filter therethrough into the light guide 340. Therefore, the light (i.e., the photoluminescence 310L2 and the third reflected light) which can reach the third color filter 363 corresponds to the first light 310L emitted by the first light emitter 310 in the overlapping time interval OLT2 and the third light emitted by the third light emitter 330 in the third time interval T3. It can be seen that the first light 310L and the third light emitted from the first light emitter 310 and the third light emitter 330 in the overlapping time interval OLT2 are later on changed into the photoluminescence 310L2 and the third reflected light, respectively, and the photoluminescence 310L2 and the third reflected light pass through the third color filter 363 at the same time and are changed into the filtered light 310L2' and the third light, respectively, to form a combined light beam 340L in the light guide 340. The combined light beam 340L includes the third light with a higher color purity and the filtered light 310L2' with a lower color purity, so that the brightness of the combined light beam 340L may be increased, and at the same time to achieve the effect of color gamut change. In addition, although the combined light beam 340L is dominated by the third color band of the green light, the combined light beam 340L has a lower color purity than the native green light. Furthermore, when the third light emitter 330 is a laser diode, the speckle problem of laser may be effectively improved.

Figure 8:
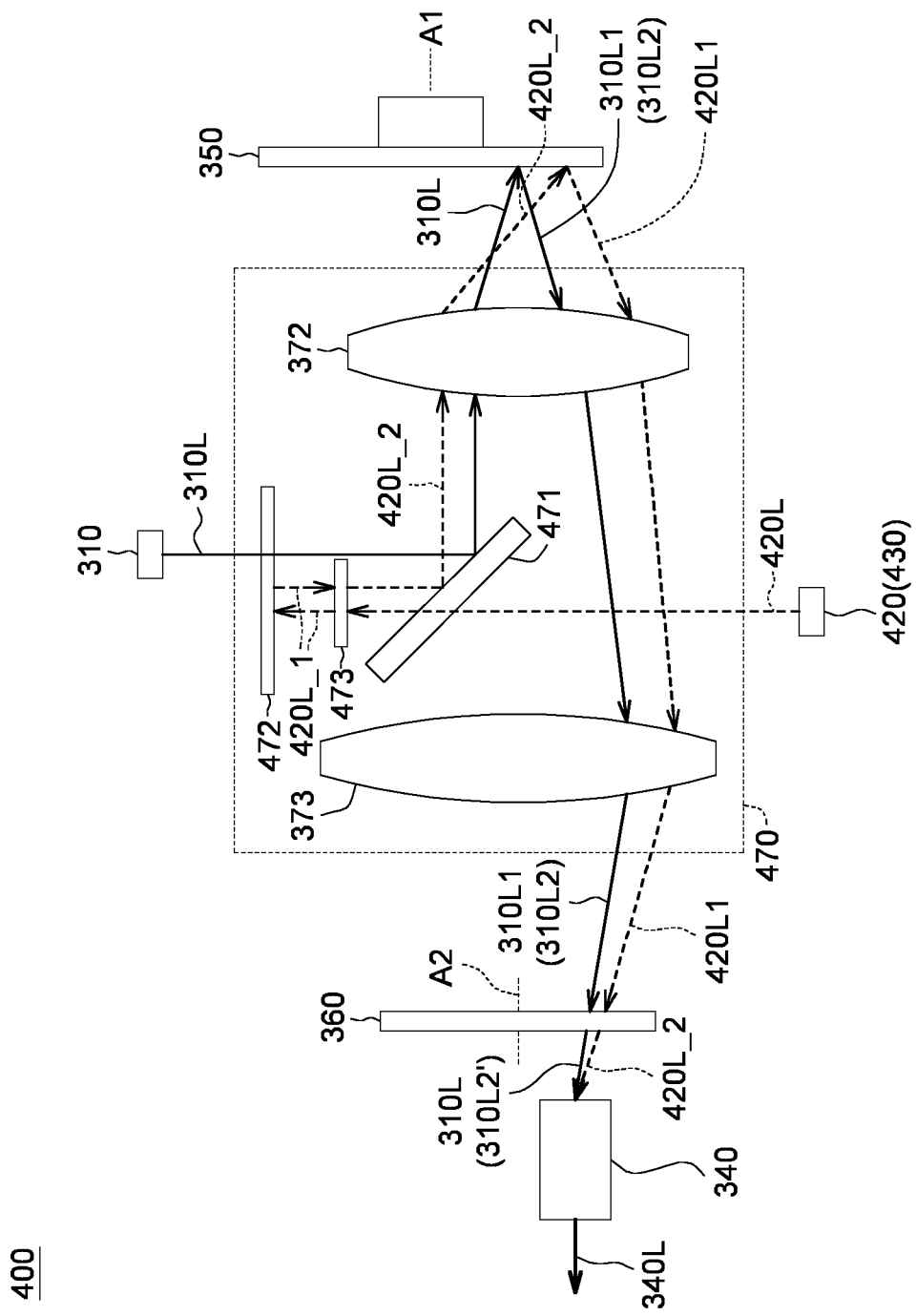
FIG. 8 is a drawing showing the layout of the light source system according to a further embodiment of the present invention.

Referring to FIG. 8, a drawing showing the layout of the light source system 400 according to a further embodiment of the present invention is shown. One of the differences between the light source system 400 of the present embodiment and the light source system 300 of FIG. 6 is the position of the second light emitter 420 and the third light emitter 430, and the remaining similarities are marked with the same reference numerals and will not be repeated.

In the present embodiment, the first light emitter 310 and the second light emitter 420 (or the third light emitter 430)

are disposed on different sides of the light-guiding module 470, for example but not limited to being on opposite sides of the light-guiding module 470, and the lights are incident from opposite sides of the light-guiding module 470, respectively. The light-guiding module 470 may include a first light splitter 471, a second light splitter 472 and a polarizer 473. The first light splitter 471 and the second light splitter 472 are disposed in the optical paths of the first light 310L and the second light 420L. The first light splitter 471 may allow the second light 420L with a first polarization state to pass through and reflect the first light 310L and the second light 420L_2 with a second polarization state. The second light splitter 472 may allow the first light 310L to pass through and reflect the second light 420L_1. The polarization direction of the second light 420L may be changed by the polarizer 473. After passing through the first light splitter 471, the second light 420L first passes through the polarizer 473 to become the second light 420L_1 with a changed polarization state. Next, the second light 420L_1 with the changed polarization state is reflected by the second light splitter 472 and passes through the polarizer 473 again to become the second light 420L_2 with a second polarization state. In one embodiment, the polarizer 473 may be a quarter-wave plate, and thus the second light 420L_2 is rotated by 90° compared to the second light 420L, so that the second light 420L, which was originally P-wave, for example, is transformed into the second light 420L_2, which is S-wave. Next, the first light splitter 471 reflects the second light 420L_2 with the second polarization state and directs it to the lens 372, so that the second light 420L_2 passes through the lens 372 and is directed to the phosphor wheel 350.

Similarly, the third light emitter 430 may have the same optical path of transmission as the second light emitter 420, and will not be repeatedly described herein.

In summary, the light source system provided according to the present invention produces a combined light beam by allowing two light emitters to emit coloured light simultaneously in one or more time intervals of a time period. The combined light beam is dominated by the color band of one of the coloured light, but has a lower color purity compared to that coloured light, thereby achieving the effect of color gamut change and brightness enhancement. In addition, when the light emitter is a laser diode, the speckle problem of laser may be effectively improved. Furthermore, in the embodiment where a phosphor wheel and a color wheel are included, the extent of the region of the wavelength conversion area and the corresponding color filter may be increased or decreased according to the actual design requirements so as to change the brightness gain.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A light source system comprising:
a first light emitter configured to emit a first light with a first color band in a first time interval of a time period;
a second light emitter configured to emit a second light with a second color band in a second time interval of the time period rather than in the rest of the time period other than the second time interval; and
a light guide disposed downstream from the first light emitter and the second light emitter;
wherein the first time interval and the second time interval overlap in an overlapping time interval, the first light emitter and the second light emitter synchronously emit the first light and the second light in the overlapping time interval to form a combined light beam in the light guide, and the light with the second color band is dominant of the combined light beam;
the first time interval covers entire of the time period, and consists of the overlapping time interval and a non-overlapping time interval, the first light emitter emits the first light with a first light intensity in the overlapping time interval, and emits the first light with a second light intensity in the non-overlapping time interval, and the first light intensity is lower than the second light intensity.

2. The light source system according to claim 1, wherein the combined light beam comprises the second light and the first light with the first light intensity, and the first light intensity is lower than a light intensity of the second light.

3. The light source system according to claim 1, wherein the first light is blue light, and the second light is red light or green light.

4. A light source system comprising:
a first light emitter configured to emit a first light with a first color band in a first time interval of a time period;
a second light emitter configured to emit a second light with a second color band in a second time interval of the time period rather than in the rest of the time period other than the second time interval; and
a light guide disposed downstream from the first light emitter and the second light emitter;
wherein the first time interval and the second time interval overlap in an overlapping time interval, the first light emitter and the second light emitter synchronously emit the first light and the second light in the overlapping time interval to form a combined light beam in the light guide, and the light with the second color band is dominant of the combined light beam;
the first light emitter does not emit the first light in the rest of the time period other than the first time interval, the first time interval consists of the overlapping time interval and a non-overlapping time interval, and the light source system further comprising:
a phosphor wheel comprising:
a wavelength conversion area disposed in an optical path of the first light emitted from the first light emitter in the overlapping time interval, wherein the first light becomes a photoluminescence after reflected by the wavelength conversion area; and
a first reflection area disposed in the optical path of the first light emitted from the first light emitter in the non-overlapping time interval, wherein the first light becomes a first reflected light after reflected by the first reflection area; and
a color wheel comprising:
a first color filter disposed in an optical path of the first reflected light so that the first light filters therethrough into the light guide; and
a second color filter disposed in an optical path of the second light and an optical path of the photoluminescence so that the second light and a filtered light with the second color band filter therethrough into the light guide.

5. The light source system according to claim 4, wherein the first reflection area is disposed in a rotation path of the wavelength conversion area.

6. The light source system according to claim 4, wherein the phosphor wheel is not disposed in the optical path of the second light.

7. The light source system according to claim 6, further comprising a light-guiding module configured to:
- direct the first light emitted in the overlapping time interval to the wavelength conversion area of the phosphor wheel, and direct the photoluminescence to the second color filter of the color wheel;
- direct the first light emitted in the non-overlapping time interval to the first reflection area of the phosphor wheel, and direct the first reflected light to the first color filter of the color wheel; and
- direct the second light to the second color filter of the color wheel.

8. The light source system according to claim 7, wherein the light-guiding module comprises:
- a first light splitter disposed in the optical path of the first light and the optical path of the second light, and configured to allow the second light to pass through and reflect the first light; and
- a second light splitter disposed in the optical path of the photoluminescence, the optical path of the first reflected light and the optical path of the second light, and configured to allow the photoluminescence, the first reflected light and the second light with a first polarization state to pass through and reflect the second light with a second polarization state.

9. The light source system according to claim 8, wherein the light-guiding module further comprises a polarizer and a reflector, and after passing through the second light splitter, the second light with the first polarization state passes through the polarizer, is reflected by the reflector and passes through the polarizer in sequence to become the second light with the second polarization state.

10. The light source system according to claim 4, wherein the phosphor wheel further comprises a second reflection area disposed in the optical path of the second light, and the second light becomes a second reflected light after reflected by the second reflection area.

11. The light source system according to claim 10, wherein the first reflection area is disposed in a rotation path of the wavelength conversion area, and the second reflection area is not disposed in a rotation path of the first reflection area.

12. The light source system according to claim 11, further comprising a light-guiding module configured to:
- direct the first light emitted in the overlapping time interval to the wavelength conversion area of the phosphor wheel, and direct the photoluminescence to the second color filter of the color wheel;
- direct the first light emitted in the non-overlapping time interval to the first reflection area of the phosphor wheel, and direct the first reflected light to the first color filter of the color wheel; and
- direct the second light to the second reflection area of the phosphor wheel, and direct the second reflected light to the second color filter of the color wheel.

13. The light source system according to claim 12, wherein the first light emitter and the second light emitter are disposed on the same side of the light-guiding module.

14. The light source system according to claim 13, wherein the light-guiding module comprises a reflector disposed in the optical path of the first light and the optical path of the second light, and the second light emitter emits the second light to the reflector at an angle different from that of the first light.

15. The light source system according to claim 12, wherein the first light emitter and the second light emitter are disposed on different sides of the light-guiding module.

16. The light source system according to claim 15, wherein the light-guiding module comprises:
- a first light splitter disposed in the optical path of the first light and the optical path of the second light, and configured to allow the second light with a first polarization state to pass through and reflect the first light and the second light with a second polarization state; and
- a second light splitter disposed in the optical path of the first light and the optical path of the second path, and configured to allow the first light to pass through and reflect the second light.

17. The light source system according to claim 4, wherein the first light is blue light, and the second light is red light or green light.

* * * * *